United States Patent
Daoud

[11] Patent Number: 6,142,835
[45] Date of Patent: Nov. 7, 2000

[54] BUILDING ENTRY PROTECTION UNIT

[75] Inventor: Bassel H. Daoud, Parsippany, N.J.

[73] Assignee: Lucent Technologies, Inc., Murray Hill, N.J.

[21] Appl. No.: 09/143,566

[22] Filed: Aug. 28, 1998

[51] Int. Cl.[7] .................................................. H01R 9/22
[52] U.S. Cl. ............................ 439/709; 439/94; 439/532
[58] Field of Search .............................. 439/49, 532, 709, 439/719, 92, 94; 379/399, 412, 442

[56]  References Cited

U.S. PATENT DOCUMENTS

| | | | |
|---|---|---|---|
| Re. 35,929 | 10/1998 | Daoud | 379/399 |
| 5,363,440 | 11/1994 | Daoud | 379/399 |
| 5,370,547 | 12/1994 | Daoud | 439/304 |
| 5,550,916 | 8/1996 | Daoud | 379/399 |
| 6,019,155 | 2/2000 | Daoud | 160/134 |

OTHER PUBLICATIONS

One page drawing identified as "Daoud—14" as Lucent Technologies—Proprietary (undated).

Five pages of Krone catalog depicting various field assembly kits and connect/disconnect module/rod mounts (all undated).

*Primary Examiner*—Khiem Nguyen
*Attorney, Agent, or Firm*—Synnestvedt & Lechner LLP

[57]  ABSTRACT

A building entry protection unit for interconnecting telephone lines with a regional telephone system is disclosed. The unit features a housing having a hinged frame with extending prongs for mounting wire connectors. The housing and frame form an enclosed splice chamber where the regional telephone lines are connected to the unit.

9 Claims, 4 Drawing Sheets

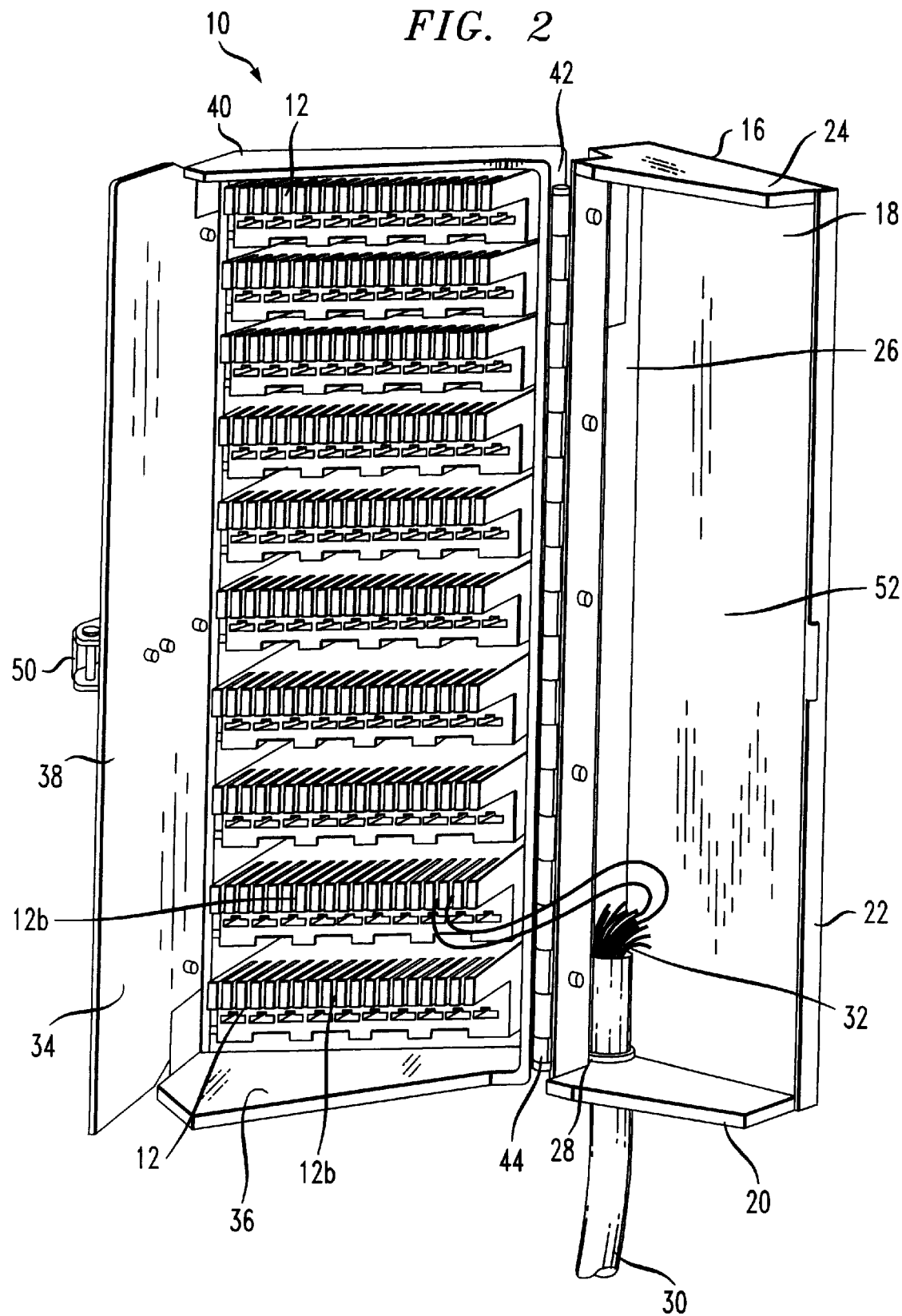

BUILDING ENTRY PROTECTION UNIT

FIELD OF INVENTION

This invention relates to electrical junction boxes and more particularly to building entry protection units used to interconnect telephone lines from the local telephone company with the customer's telephone lines.

BACKGROUND AND OBJECTS OF INVENTION

Electrical junction boxes used in telecommunications provide an organized and convenient interface for connecting communication equipment in a building, such as telephones, facsimile machines and computer modems, with the regional lines of a telephone system. One example of such a junction box is the "building entry protection" unit or BEP.

Traditionally, BEPs are constructed having three interconnected parts called "fields". A first field has a multiplicity of wire connectors for attaching the telephone wiring within the building (the inside lines) to the BEP.

The wire connectors are, in turn, electrically connected to the second field which houses a multiplicity of replaceable surge protectors. Each inside telephone line is connected to an outside telephone line through an individual surge protector. The surge protector functions to ground and thereby isolate the outside telephone line from the inside telephone line in the event of a power surge in the outside line, such as that produced by a lightning strike or an accidental contact of a power line with the telephone cable. Such a current, if allowed to travel beyond the BEP, could destroy the communication equipment within the building and possibly electrocute a person using the equipment at the time of the surge.

The surge protectors shunt the dangerous current surge to ground and thereby protect the users and equipment. The surge protectors are electrically connected to the outside telephone lines in the third field of the BEP called the splice chamber. The outside lines, bundled as a cable, enter the BEP via the splice chamber where individual lines from the cable are spliced with wire segments which lead to the surge protectors. Usually, the wire segments in the splice chamber are thinner gauge than both the outside and inside wires of the system and, therefore, the most likely point to catch fire due to a power surge. In this manner, any fire that occurs will likely be confined to the splice chamber. To prevent the spread of fire from the BEP itself, the splice chamber is fully enclosed, having an access door to permit servicing of the wires in the splice chamber.

The three fields of the BEP are typically arranged side-by-side in an enclosure which is mounted to a wall of the building. This BEP configuration is inefficient, however, because it requires a relatively large enclosure to handle a relatively modest number of telephone lines. Such BEPs were adequate in the past when fewer telephone lines were required, for example, in office buildings. However, with the proliferation of telephones, facsimile machines and computer modems in modern offices, the demand for telephone lines has increased to the point where greater space efficiency is required.

It is an object of the invention to provide a compact electrical junction box for efficiently effecting a multiplicity of wire connections.

It is another object of the invention to provide a junction box in which the wire connections are readily serviceable.

It is yet another object of the invention to provide a junction box which will hinder the spread of fire in the event of a current surge.

It is still another object of the invention to provide a junction box which can provide a safe path to ground for a current surge.

These and other objects will become apparent from a consideration of the following drawings and detailed description of the invention.

SUMMARY OF INVENTION

The improved BEP unit according to the invention comprises a housing having a base member and a plurality of sidewalls extending from the base member. The housing has an aperture sized to accept a cable containing the bundled outside telephone lines. The housing also has a ground connector for electrical connection to a local ground. A frame is hingedly mounted to the housing and has an opening in which the connectors are held. The frame is movable between an open position and a closed position. The frame comprises a plurality of edge members which are positioned adjacent to the sidewalls when the frame is in the closed position.

A splice chamber is disposed between the base member and the frame. The splice chamber is formed by the edge members and the sidewalls when the frame is in the closed position. A plurality of wire connector mounting prongs extend from the frame in a direction away from the splice chamber. The connectors are mountable on the prongs in a position to enclose the opening in the frame.

It is preferred to make the housing and frame from metal and to provide a grounding member connectable between the cable and the housing for grounding the cable to the housing.

Preferably, the prongs are arranged in a parallel, spaced-apart relation to accept Z-shaped insulation displacement connectors or ZIDCs which are preferred for effecting wire connections. The connectors are arranged on the prongs adjacent to each other and extend into the splice chamber where the connection is made between the ZIDCs and the outside wires. The ZIDCs are closely spaced to substantially close off the opening in the frame and thereby enclose the splice chamber, thus, preventing fire from escaping from the BEP should the wiring become overheated. The prongs are preferably made of metal to provide an electrical path between the connectors and the local ground through the frame and the housing.

BRIEF DESCRIPTION OF DRAWINGS

FIG. 2 shows a perspective view of a building entry protection unit in an open configuration.

DETAILED DESCRIPTION OF THE PREFERRED EMBODIMENTS

Figure 1:
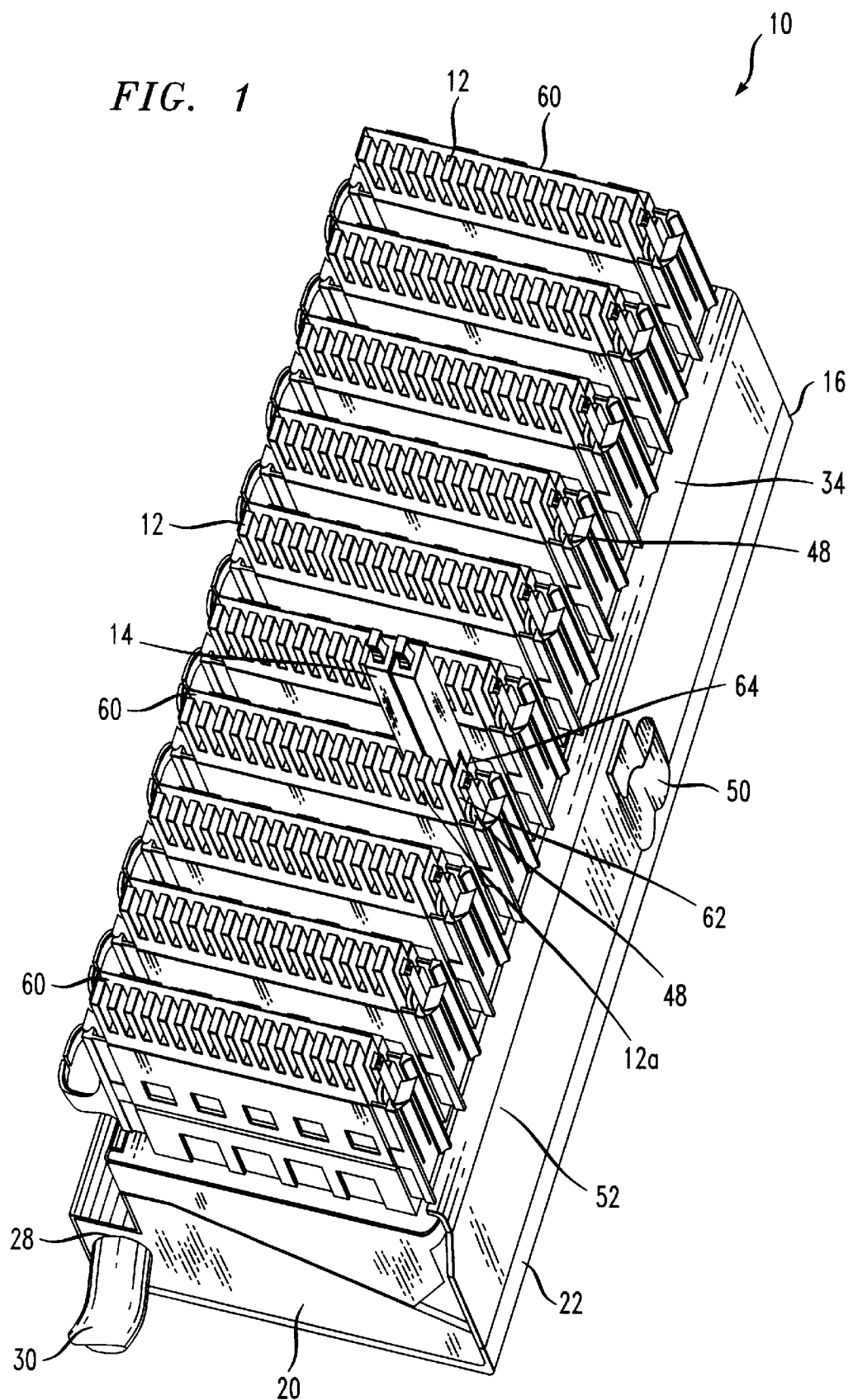
FIG. 1 shows a perspective view of a building entry protection unit according to the invention in a closed configuration.
Figure 3:
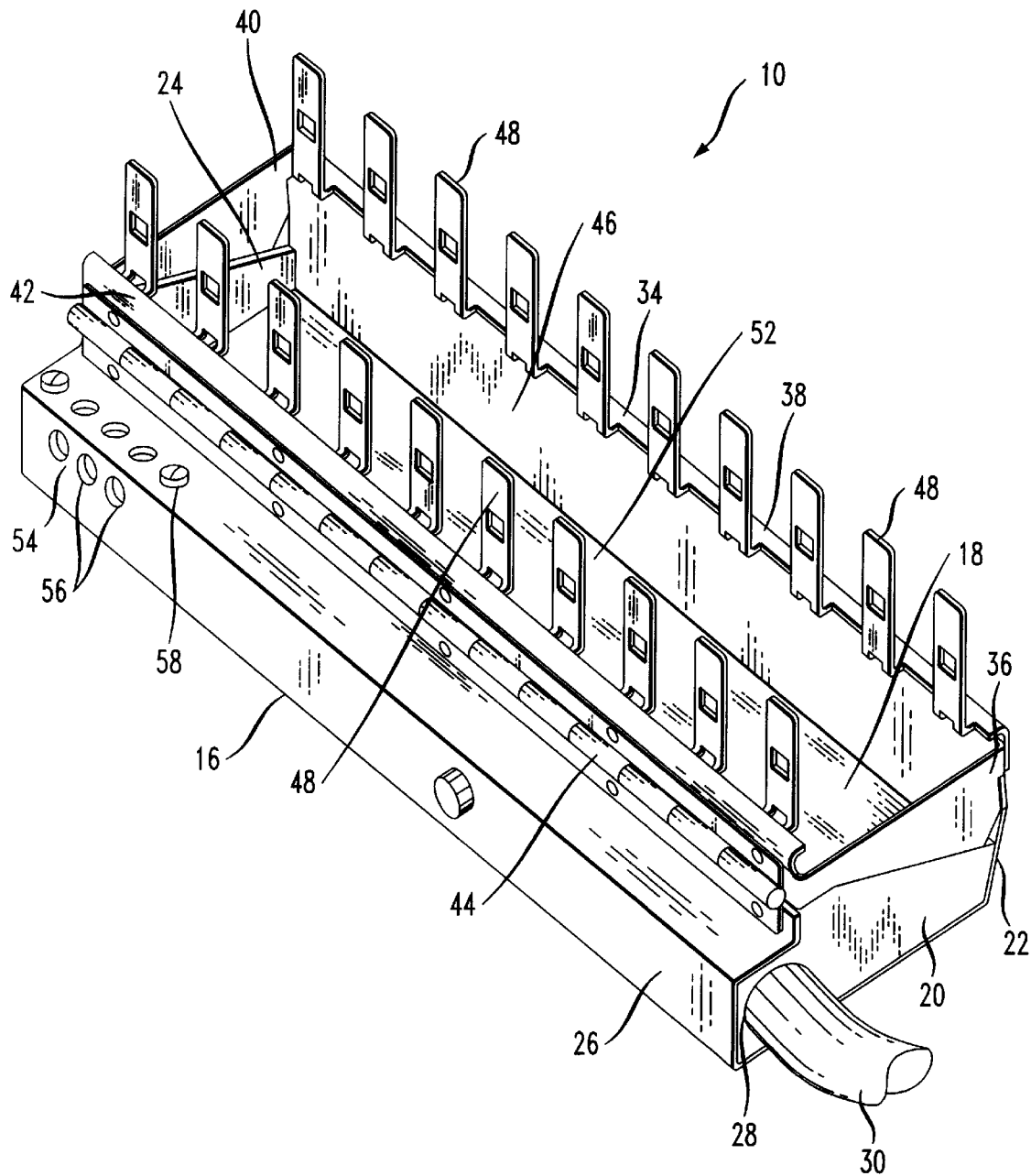
FIG. 3 shows a perspective view of a building entry protection unit with the wire connectors removed.

FIG. 1 shows a BEP 10 with a plurality of ZIDC type-wire connectors 12 mounted thereon. Two replaceable surge protectors 14 are mounted on the front 12a of one of the wire connectors to illustrate the complete mounting configuration. As best seen in FIGS. 2 and 3, the BEP according to the invention comprises a housing 16 having a base member 18 and a plurality of sidewalls 20, 22, 24 and 26 extending therefrom forming the base portion of the splice chamber 52. Housing 16 is typically mounted to a permanent structure, such as the wall of a building. A first aperture 28 is located in housing 16, the aperture being sized to accept a cable 30 containing bundled telephone lines 32 which represent the outside lines of a regional telephone system. The cable 30 can be grounded to the housing 16 using a D-bond clamp as known in the art. The clamp section itself can be bolted to the housing 16 to eliminate the ground cable associated with the clamp. Telephone lines 32 are connected to the rear side 12b of the wire connectors 12, shown in FIG. 2.

A frame 34 for supporting wire connectors 12 is hingedly mounted on to housing 16. Frame 34 is formed from a plurality of edge members 36, 38, 40 and 42. Pivoting means, in the form of hinge 44, are provided to pivotally mount the frame to the housing. Although a piano-type hinge is shown, the hinge could also comprise an elongated flexible strip formed from a multiplicity of copper wires braided into a fabric, as disclosed in U.S. application Ser. No. 09/120,262, hereby incorporated by reference.

As seen in FIG. 3, the frame edge members and housing sidewalls define a second opening 46 in the BEP for accepting wire connectors 12. A plurality of mounting prongs 48 extend outwardly from the frame along the perimeter of the second opening 46. Prongs 48 are arranged in a parallel, spaced-apart relation so as to be interengagable with the wire connectors. The prongs, together with frame 34, provide the means for mounting the connectors onto the BEP.

Frame 34 is movable on hinge 44 between a closed position shown in FIG. 1 and an open position shown in FIG. 2. A hasp 50 is provided to lock the frame in the closed position. In the closed position, each edge member 36, 38, 40 and 42 is positioned adjacent to a respective sidewall 20, 22, 24 and 26, the frame and housing thereby together form an enclosed splice chamber 52 located within the BEP, the frame 34 covering the lower portion of the splice chamber 52 formed by the housing 16. By closely spacing wire connectors 12 within the opening 46 formed by frame 34, the chamber is enclosed to prevent, or at least retard, the escape of any flames from the chamber in the event a current surge overheats any of the wires 32.

The open position (FIG. 2) exposes the splice chamber and provides access for servicing the wire connectors, effecting wire connections and the like.

Means for electrically grounding the BEP 10 to a local ground are provided by the grounding connector 54 seen in FIG. 3. Connector 54 has apertures 56 which accept a grounding cable (not shown) which is, in turn, connected to a suitable ground source. clamping screws 58 are arranged intersecting apertures 56 and bear on the grounding cable when tightened to retain the cable in electrical contact with housing 16. Preferably, housing 16, frame 34 and prongs 48 are constructed of metal so that the entire BEP is grounded to grounding connector 54.

Figure 1A:
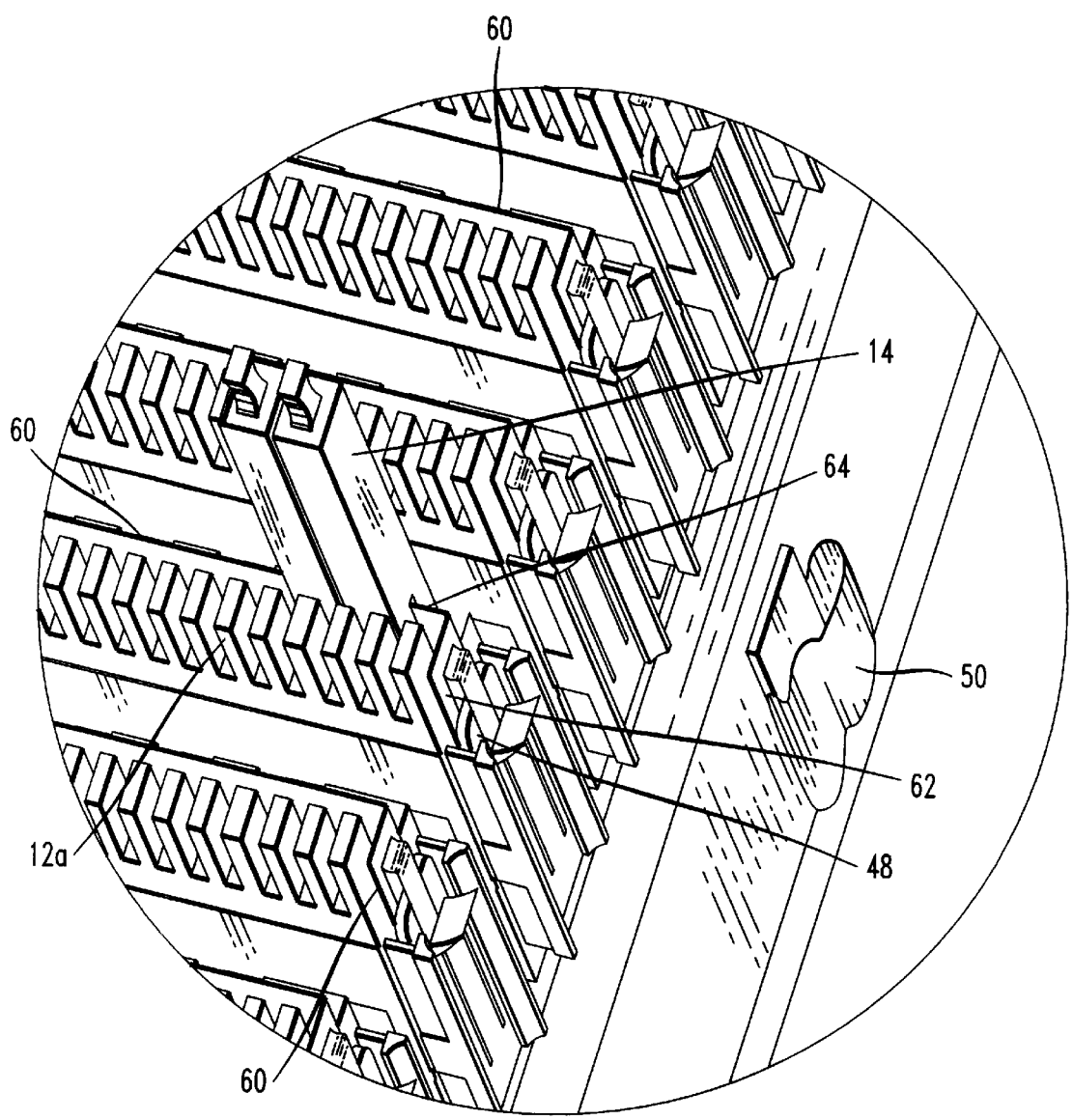
FIG 1A shows a portion of FIG. 1 on a enlarged scale.

As shown in FIG. 1A, the surge protectors 14 are grounded by means of metal clips 60. Each wire connector has a clip 60 mounted on its front 12a. Each clip 60 comprises an elongated metal plate having turned down sides 62 which connect each end of the clip to a prong 48. Surge protectors 14 engage the front edge 64 of each clip 60, thereby making electrical contact for grounding purposes.

It is important that there be a good electrical connection between the frame 34 and housing 16, as the surge protectors 14 are grounded to the frame 34. Thus, the pathway to ground for a surge protector is through the clips 60, to the frame 34, to the housing 16 and grounding connectors 54. If a piano hinge 44 is used to connect the frame 34 and housing 16, a separate ground wire or strap between the frame 34 and housing 16 is preferred. Other types of hinges, such as the wire braided hinge disclosed in my U.S. application Ser. No. 09/120,262 provide a good ground connection and need to additional ground connections.

By positioning wire connectors 12 in overlying relationship with splice chamber 52 the BEP 10 according to the invention provides a compact, efficient and safe means for connecting a multiplicity of telephone lines in an office building, for example, with the telephone lines of a regional telephone system.

What is claimed is:

1. A building entry protection unit for use with a plurality of wire connectors having surge protectors mountable thereon, said unit comprising:

a housing having a base member and a plurality of sidewalls extending from said base member, said housing having an aperture sized to accept a cable, said housing further comprising a ground connector for electrically connecting said housing to a local ground;

a frame hingedly mounted to said housing to be movable between an open position and a closed position, said frame comprising a plurality of edge members defining an opening, said edge members positioned to be adjacent said sidewalls when said frame is in said closed position;

a splice chamber disposed between said base member and said frame, said splice chamber being formed by said edge members and sidewalls when said frame is in said closed position; and a plurality of connector mounting prongs extending from said frame away from said splice chamber, said prongs being interengagable with the wire connectors for mounting the wire connectors onto said frame and for positioning one end of the connectors within the opening of said frame to enclose said opening.

2. A building entry protection unit according to claim 1, wherein said housing and said frame are made of metal.

3. A building entry protection unit according to claim 2, wherein said mounting prongs are arranged in a parallel, spaced apart relation to accept Z-shaped insulation displacement connectors, the connectors being arrangeable on said prongs adjacent to each other and extending into said splice chamber to substantially close off said splice chamber.

4. A building entry protection unit according to claim 3, wherein said mounting prongs are made of metal and provide an electrical path between the connectors and the local ground through said frame and said housing.

5. A building entry protection unit according to claim 1, wherein said frame is hingedly mounted to said housing with a piano-type hinge.

6. A building entry protection unit for use with a plurality of wire connectors having surge protectors mountable thereon, said unit comprising:

a housing having a base member and a plurality of sidewalls extending from said base member and forming at least a lower portion of a splice chamber, said housing having an aperture sized to accept a cable, said housing further comprising a ground connector for electrically connecting said housing to a local ground;

a frame hingeably mounted to said housing to be movable between an open position and a closed position covering said splice chamber, said frame comprising an opening positioned over said splice chamber when said frame is in the closed position;

a plurality of connector mounting prongs, said prongs being interengagable with the wire connectors for mounting the wire connectors onto said frame and for positioning one end of the connectors within the opening of said frame to enclose said opening.

7. A building entry protection unit according to claim 6 comprising a piano hinge interconnected between said frame and said housing.

8. A building entry protection unit according to claim 6, wherein said mounting prongs extend in a direction away from said splice chamber.

9. A building entry protection unit according to claim 8, wherein said mounting prongs are arranged in a parallel, spaced apart relation to accept a Z-shaped insulation displacement connector, the connector being arrangeable on said prongs to extend into said splice chamber.

* * * * *